US 6,519,763 B1

(12) United States Patent
Kaufer et al.

(10) Patent No.: US 6,519,763 B1
(45) Date of Patent: Feb. 11, 2003

(54) TIME MANAGEMENT AND TASK COMPLETION AND PREDICTION SOFTWARE

(75) Inventors: Stephen Kaufer, Newton, MA (US); Marco A. Emrich, Westchester, OH (US); Arunachallam Sivaprakasam Sivakumar, Issaquah, WA (US); Thomas Palka, San Diego, CA (US)

(73) Assignee: Compuware Corporation, Farmington Hills, MI (US)

( * ) Notice: Subject to any disclaimer, the term of this patent is extended or adjusted under 35 U.S.C. 154(b) by 0 days.

(21) Appl. No.: 09/277,732

(22) Filed: Mar. 29, 1999

Related U.S. Application Data

(60) Provisional application No. 60/079,819, filed on Mar. 30, 1998.

(30) Foreign Application Priority Data

Mar. 30, 1998 (CA) .............................................. 2233359

(51) Int. Cl.[7] ................................................ G06F 9/44
(52) U.S. Cl. ........................ 717/101; 717/100; 706/21; 706/47; 706/45; 706/46
(58) Field of Search ............................. 717/1, 11, 3, 6, 717/8, 101, 100, 120, 121; 707/3, 302, 2, 10; 706/21, 45, 46, 10, 11, 12, 13, 16; 709/302

(56) References Cited

U.S. PATENT DOCUMENTS

| | | | | |
|---|---|---|---|---|
| 5,437,032 A | * | 7/1995 | Wolf et al. ................. | 709/103 |
| 5,446,895 A | * | 8/1995 | White et al. ................ | 717/1 |
| 5,797,000 A | * | 8/1998 | Bhattacharya et al. ....... | 707/2 |
| 5,918,219 A | * | 6/1999 | Isherwood .................. | 705/37 |
| 5,918,226 A | * | 6/1999 | Tarumi et al. .............. | 707/10 |

(List continued on next page.)

OTHER PUBLICATIONS

Title: Modeling Design Tasks and Tools—The link between the product and the flow–, author: schiirman et al, ACM, 1997.*

Primary Examiner—Kakali Chaki
Assistant Examiner—Chameli C. Das
(74) Attorney, Agent, or Firm—Lieberman & Brandsdorfer, LLC

(57) ABSTRACT

A computer software application in the form of a software management and task completion and prediction apparatus by which project completion can be ascertained and management of a project can be maintained with a high efficiency and accuracy. The software application is a web-based application which enables users to proactively manage and accurately predict strategic software development and deliverables. This application and delivery management system comprises distributed data collectors, an application server and a browser interface. The data collectors automatically gather data already being generated by various tools within the organization, such as scheduling, defect tracking, requirements management and software quality tools. This data is constantly being collected and fed into the application server, thereby providing objective and updated information. New tools can be easily added without disrupting operations. The data collected is fed into the applications server which is the brain of the apparatus. The application server analyzes the data collected by the data collectors to generate a statistically significant probability curve. This curve is then compared to the original planned schedule of product delivery to determine if the project is meeting its targets. Based upon this comparison, the software application predicts a probable delivery date based upon the various inputs and variables from the development process. In addition, the application server also generate early warning alerts, as needed and indicated. At such time as the software apparatus identifies a potential problem, the alerts automatically inform the user, so as to mitigate a crisis and assist with resolution of the problem. The alerts are communicated to the designated user by e-mail.

29 Claims, 3 Drawing Sheets

U.S. PATENT DOCUMENTS 6,041,365 A  *  3/2000  Kleinerman ................. 709/302
6,049,671 A  *  4/2000  Slivka et al. .................. 717/11
6,157,935 A  * 12/2000  Tran et al. ................... 707/503
6,202,060 B1 *  3/2001  Tran .............................. 707/3
6,243,451 B1 *  6/2001  Shah et al. .................. 379/201
6,256,773 B1 *  7/2001  Bowman-Amuah ............ 717/1
6,324,647 B1 * 11/2001  Bowman-Amuah ......... 713/201

* cited by examiner

```
+---Acqua
   +---(x86-win32,sparc-solaris2,pa-hpux10,...)           FIG. 2
   |  +---bin
   |  +---cgi-bin
   |  +---lib
   +---configuration              - where configuration related html files live
   |
   +---projects
   |  +---ENTERPRISE              - this directory gets run after all prjs are done
   |     +---report/index         - enterprise type report listing
   |             /project_list.html
   |     +---collect              - enterprise collection
   |     +---analyze              - enterprise analysis
   |     +---archives
   |        +---LATEST
   |             (eventually a project_list.html page lives here)
   |  +---skinner (files for the skinner project)
   |     +---report - index (stores titles/paths to various .html files)
   |             including project specific files that are stored in this directory
   |     +---collect    - index, prj_dev.dcol, prj_qc.dcol, req_dev.dcol, req_qa.dcol
   |     +---analyze    - index (stores paths to the various analyze files)
   |     +---archives
   |        +---LATEST              - latest tree of reports, easy to bookmark
   |          | +---quality         - by convention, quality related reports
   |          | +---schedule        - by convention, schedule related reports
   |          | +---functionality   - by convention, func related reports
   |          | +---status          - by convention, status related reports
   |        +---1997-04-02-1302    - full tree of everything as of this date
   |          | +---quality         - by convention, quality related reports
   |          | +---schedule        - by convention, schedule related reports
   |          | +---functionality   - by convention, func related reports
   |          | +---status          - by convention, status related reports
   |        +---1997-04-01-1302    - full tree of everything as of this date
   |            +---quality         - by convention, quality related reports
   |            +---schedule        - by convention, schedule related reports
   |            +---functionality   - by convention, func related reports
   |            +---status          - by convention, status related reports
   |
   +---common   (common files that can be used by any project, untouched by appsvr)
   |   +---report    - a place to store common html files, referenced by many projects
   |   +---analyze   - a place to store common analysis programs
   |   +---collect   - a place to store common collector (.dcol, .tmpl) files
   |
   +---template  (original files that are the template for every new project)
   |    +---report  - raw sources to html pages that form the basis of each new project
   |         +---status          - raw status related pages
   |         +---quality         - raw quality related pages
   |         +---schedule        - raw schedule related pages
   |         +---functionality   - raw functionality related pages
   |    +---analyze  - template area for analysis configuration files
   |    +---collect  - template area for .dcol configuration files
   +---lib
      +---com
         +---centerline
             +---Acqua (contains all Java .class files used by the reports)
```

TIME MANAGEMENT AND TASK COMPLETION AND PREDICTION SOFTWARE

This is a non-provisional utility patent application claiming benefit of the filing date of U.S. provisional application serial no. 60/079,819 filed Mar. 30, 1998, and titled COMPUTER SOFTWARE DEVELOPMENT TIME MANAGEMENT AND TASK COMPLETION & PREDICTION APPARATUS.

APPENDIX

This application contains two copies of a CD-ROM with a copy of each of the Appendixes. The two CD-ROMSs are identical, and each of the files in the CD-ROMs are IBM MS-Windows operating system compatibility. The following files are contained in each of the CD-ROMs: Appendix_part1.txt, 28,169 bytes, created May 8, 2002; Appendix_part2.txt, 54,081 bytes, created May 8, 2002; and Appendix_part3.txt, 243,456 bytes, created May 8, 2002 which are hereby incorporated by reference.

FILED OF THE INVENTION

The present invention generally relates to the automated collection and processing of project completion data relating to computer software development, and more particularly to the manipulation of the accumulated data through a Monte Carlo simulation in order to analyze and determine projected project completion based upon current information made available through accumulated data extracted through project monitoring and user input, if desired. Both projected project completion and projected potential development difficulties are ascertained in order to alert and/or apprize system users of current project status.

SUMMARY OF THE INVENTION

In accordance with the present invention, the foregoing objectives are met by a data extraction and manipulation process which employs a mathematical algorithm and knowledge base of rules to provide a prediction of anticipated project completion with enhanced accuracy. Data collection is accomplished through the use of data collectors specifically designed to extract data from tools utilized to accumulate data. Data is accumulated by the data collectors and then transferred to a computer system functioning as the application server. The data collectors are automated to gather data generated by the tools within the system organization. Accordingly, the collected data is stored on an application server for evaluation of the schedule for projected completion and project status, including estimated cost, available functionality, and quality levels.

The data extraction and manipulation process further meets the foregoing objectives by employing the aforementioned mathematical algorithm and applying the aforementioned knowledge base to provide the ability to alert system users to potential difficulties which may affect project completion prior to the occurrence of such difficulties in order for system users to be able to make necessary adjustments to minimize or prevent such projected difficulties from occurring. In a preferred embodiment of the invention, data collectors are used to obtain and accept project information stored on various computers on a corporate network, wherein the data collected is then subject to an algorithm, including the use of a Monte Carlo simulation, for prediction of project completion and scheduled delivery.

As a further embodiment of the invention, the present invention establishes a probability curve for the projected schedule of completion for each task defined as a concrete deliverable unit of work. The Monte Carlo simulation is conducted over a plurality of iterations. All simulations are run on the same set of data, which has been collected from all of the tools. The data obtained from the simulations is fitted on a probability curve for assigning a confidence level for project completion in view of the given task required to complete the project. The system may be utilized to generate simulations for additional projects which may be concurrently under production. Accordingly, the simulation algorithm may be applied for one specific project or multiple projects, or the user may specify for an analysis to be conducted on one or more specific projects.

Further features of the present invention, and the advantages offered thereby, are explained hereinafter with reference to specific examples illustrated in the accompanying drawings.

BRIEF DESCRIPTION OF THE DRAWINGS

FIG. 2 is an illustration of a sample directory structure of the software;

DETAIL DESCRIPTION OF THE PREFERRED EMBODIMENTS AND BEST MODE OF THE INVENTION

To facilitate an understanding of its underlying concepts, the present invention is explained with reference to a schematic diagram and a sample directory layout structure. It will be appreciated, however, that the principles of the present invention are not limited to the examples presented in the illustrations. Rather, they are applicable to any situation in which it is desirable to provide time, cost and quality management of a project and predict completion of the project for delivery.

As noted previously, the project prediction is primarily based upon extracting data from multiple independent tools and applying a knowledge base of accepted project management metrics as well as a mathematical algorithm to the data. As will become apparent from the following description, a significant aspect of the use of the technique is that it allows the user to concentrate their energy on a timely delivery of a product within the parameters of ongoing development while minimizing interference with the development process. The resulting delivery prediction is defined by the input of development conditions in the form of accumulated data.

Figure 1:
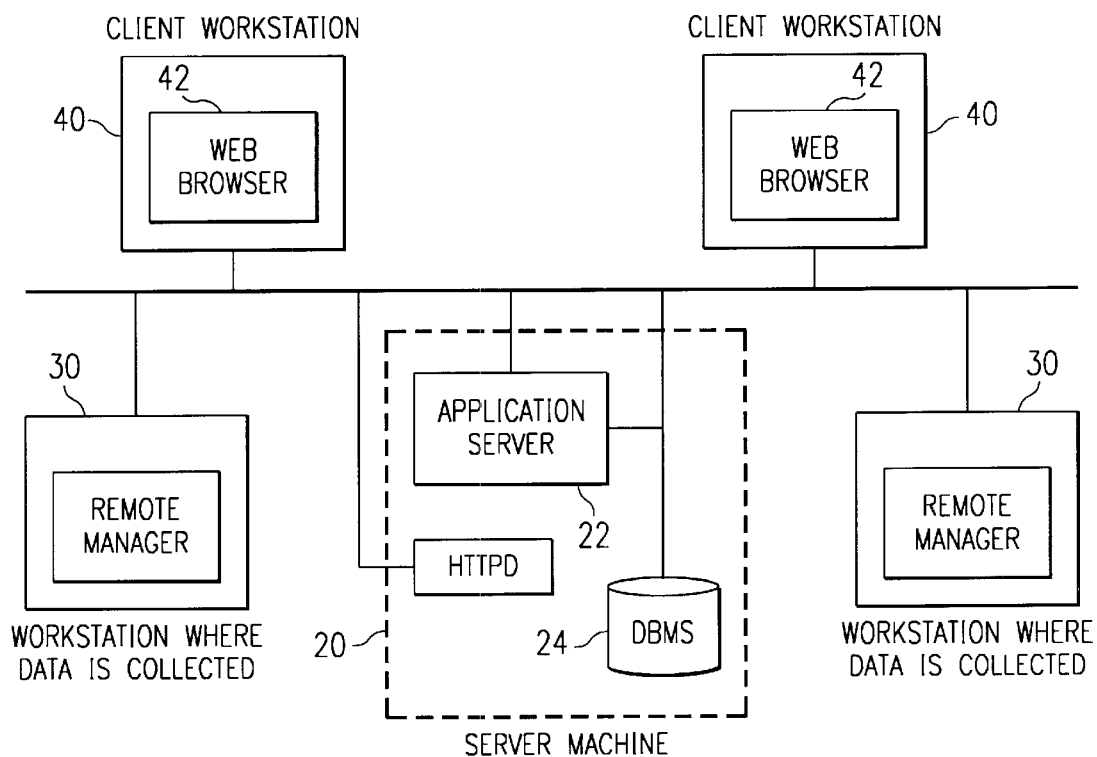
FIG. 1 is a schematic illustration of the system.

An explanation of the manner in which mathematical algorithms are applied to the system to predict project completion will first be described in a general manner with reference to a schematic illustration of a system layout, as is illustrated in FIG. 1. This figure shows a schematic illustration 10 of the system architecture. The system is comprised of a system server computer 20, further comprising an application server 22, a database 24, a web browser (not shown), and data collectors (not shown). The system further comprises Remote Managers 30, which are programs that run on workstations from which data is collected, and comprising communication tools (commonly referred to as Web Browsers) which are used to access alerts and reports generated by the system.

The application server 22 is the central component of the system. The primary responsibilities of the application server 22 are: storing project information in the database 24, accepting project information from the data collectors, and generating periodic reports and alerts regarding the status of the project. At such time as reports and alerts are generated by the system, they are presented to the user by means of a web browser 42. Accordingly, the application server 22 is the central component of the system, with its primary tasks and functions being to spawn data collectors, manage the database, analyze database information and generate reports, and to generate alerts based upon deviation of the projected time for product delivery from system users' desired time for product delivery.

Data collectors are stand alone applications whose function is to extract data from third party tools, such as defect tracking tools. A list of available data collectors is stored in an index file in a collect directory created for each project under scrutiny. Data collectors collect the data by various means and write the output to a temporary text file on a client workstation 40. After data collection is completed, the text file is transferred from the client workstation 40 to the application server 22 which then parses the text file of collected information and updates the project database 24 with the data from the individual tool. Data collectors are capable of running on computers distributed throughout an organization, therefore enabling geographically distributed projects to be centrally monitored from a single web site and a single application server.

An explanation of the system installation and layout will be described in a general manner to illustrate and best explain the organization and functions of the system. The layout will further provide further information as to how the data is collected, managed, evaluated and presented to the user. A sample directory tree structure which contains product files is illustrated in FIG. 2. For purposes of clarification, where terms appear in full capital lettering they are intended to represent the name given to a specific directory within the sample directory tree. However, the scope of the disclosure should not be limited to the titles of the directories presented. A person skilled in the art may appreciate that alternative directory designations may be utilized.

The directory layout comprises a root directory containing five directories (hereinafter "first level directories") within one level of the root directory. The first level directories are, in order of illustration in FIG. 2: 1) an operating system directory which shall be named according to the operating system of the computer system being utilized, 2) a CONFIGURATION directory where configuration related hypertext markup language (hereinafter "html") files are located, 3) a PROJECTS directory, 4) a COMMON directory, and 5) a TEMPLATE directory.

For purposes of further explanation and clarification of the system layout and installation in the preferred embodiment, the PROJECTS directory, the COMMON directory, and the TEMPLATE directory shall be explored in detail. These three directories function to manage and organize the collection and presentation of data pertaining to the given projects being monitored on the system. Note that it is equally reasonable to store this information in a database instead of within various files on the file system. The significant aspect of how this information is stored is that it enables different projects to present different views on the data being collected and analyzed, and that it allows organizations to share how the data is collected, analyzed and presented.

The TEMPLATE directory contains the virgin files that are utilized to form each new project system data collection and observation function as new projects are added to the system. The TEMPLATE directory contains the original file index for each new project and a tool for adding new projects to the system for placement into and creation of new sub-PROJECTS directories for each new project. As a new project is added to the system through the use of the files contained in the TEMPLATE directory, the directory structure and files are utilized as a template within a new project's directory located within the PROJECTS directory, as shall be further described below, and thereby provide the basis for the initial formation of a new project's discrete directory and file structure. Accordingly, the TEMPLATE directory functions as the template for the discrete project directories and files required for each new project as a project is added to the system.

The PROJECTS directory contains the sub-directories and specific files for each project and for computation and reporting for all projects combined by way of the ENTERPRISE sub-directory within the PROJECTS directory, as shall be more fully explained below. The addition of each new project as it is configured within the system through the files located within the TEMPLATE directory, results in the creation by the system of a new sub-directory and project files and indexes within the PROJECTS directory for utilization by the discrete project. In this way the original files located within the TEMPLATE directory and the TEMPLATE directory's sub-directory structure are reproduced with the addition of the newly entered project configuration information discussed above, to provide for the segregation of each project's specific files within that project's individual directory. As illustrated in FIG. 2 by way of example through the use of the "Skinner" project, a project's sub-directory structure will mimic that of the TEMPLATE directory with the addition of an ARCHIVES sub-directory which is utilized to house the reports generated by the system for the specific project further utilizing a sub-directory structure aimed at maintaining report information by time/date of report generation through the further utilization of the TEMPLATE/REPORT sub-directory and file structure for status, quality, schedule and functionality reports for the specific project. Accordingly, the PROJECTS directory houses the discrete directory and sub-directory structure, files, and indexes required for each discrete project, and as new projects are added to the system, new project specific sub-directory structures are created to house the necessary project sub-directories, files, and indexes. This TEMPLATE directory structure allows end user organizations to customize how the information about their organization is collected, maintained and presented. Customization occurs as end users manipulate the files in this TEMPLATE directory to present additional content, as well as perform additional data collection or analysis. Since this customization is done to the TEMPLATE directory, all projects being managed at this site will share these common changes.

Within the PROJECTS directory, the system maintains the ENTERPRISE directory where computation and reporting occurs for all projects as a group. As with other project sub-directories, there exists COMMON, ANALYZE and REPORTS sub-directories, each containing their index file(s). Accordingly, the actions (analysis and reporting) represented by this directory follows the execution (data collection, analysis and reporting) for all projects in the PROJECTS directory and houses the necessary cumulative files, indexes, and information for reporting on all system projects.

The system further comprises a COMMON directory which has a list of common files that are integrated throughout the product. In this way the COMMON directory contains files common to all of the projects on the system. This directory is where product-wide and company-wide alerts and/or reports are stored, and where multiple projects can share information, programs and reports. In this way, the system provides one template file for each data collector per third party tool, and one location for commonly used report and analysis programs. Accordingly, the common directory function as the location for files and templates common to all projects.

While configuring the project, the user is prompted to select the set of tools from each of the different categories. For each of the tools selected, the information from the collector template file is accessed and the system user is prompted for values for the various fields. Once all values are obtained, the data collector file is written into a specific project's COLLECT directory. The field values which are specified at the time of configuration are then available as environment variables when the data is collected for that specific project. The names of these environment variables can be specified in the template files.

Furthermore, as can be gleaned from the above discussion of the TEMPLATE directory, the system is not limited to the initial projects provided with and programmed into the system, rather new projects may be added on an as needed basis by means of a web browser. In order to add a new project to the system, the user will be prompted for information so that the system is configured to look for data from the newly added project. First, the system prompts the user to identify which data sources are available. For configuration of each data source, the user will initially have to specify a host name, a path to the data file or database, available options where appropriate, and other tool specific information that may be necessary. New data collector files are then generated by the system based upon the inputted information, wherein such files may be manually modified at a later time, if necessary. Second, the system prompts the user to indicate message delivery locations (i.e. e-mail addresses) of system users (i.e. team members) who should receive alerts from the system as to project completion and delivery schedule matters generated for the new project. Each team member whose e-mail addresses is listed in the system for the indicated project will receive all of the alerts generated. Alerts are thereby utilized by the system as a mechanism for notifying team members when there are potential problems with the project, such as when deadlines have not been met or task completion is projected to delay the given project completion schedule. Finally, the system prompts the user to indicate a schedule for collection of data from the databases so that the system may determine progress of the project and generate any necessary alerts on the system user's desired schedule. All data is collected on the same schedule. Accordingly, the system provides the above discussed outline for adding additional projects or data sources to the system on an as need basis.

The basic usage model for the application is to have a project administrator identify the key data sources for the applications being monitored. Additional key constraints and variables are entered to help the system model application development for this organization. Once setup, the system will automatically perform a 3 step process on a regular (e.g. nightly) basis. Step 1 is to automatically collect data from various tools used during the software development process. Step 2 is to analyze this data using the knowledge base of common software practices and mathematical algorithms to predict cost, timliness and quality of the software being developed. Step 3 is to present this information to end users.

As illustrated by FIG. 2 and indicated above, three sub-directories are present within the COMMON and TEMPLATE directories. These directories are the REPORT, ANALYZE and COLLECT directories, which correspond with the three step process outlined above. The REPORT directory contains the index file which lists the paths of the html files used for report generation. Each html file is designed and utilized to produce a page of a report. The html files can be located in the TEMPLATE/REPORT directory, COMMON/REPORT directory, or each project specific REPORT directory, depending on whether they are shared between projects. The report index files have a simple structure:

<report-type><when-to-generate-key>:<html filename to process>

Preferably the values for entry into the <when-to-generate-key> field are anytime, daily, weekly, or monthly.-When no value is entered in the <when-to-generate-key> field, the default value of anytime is utilized for report generation. Each html file may contain pre-processing directives that describe which html files to include or what commands to execute.

The ANALYZE sub-directory of the COMMON directory contains one file per analyzer program. Analyzers are programs that interface with the application server and database, analyze the data, and write their results to a set of tables. These results can then be used and manipulated to generate the desired reports and create projections of project completion or issue relevant alert messages to indicated system users. Similar to the REPORTS directory, the ANALYZE sub-directory of each project directory contains an index file which lists the analyzer programs which will be utilized for the given project. The format is namely:

<type-of-analysis>:<frequency-to-compute>:<name-of-analyzer file>

The analyzer programs are initiated in the sequence in which they appear in the index list. Options available for the <type-of-analysis> field are "alert" and "analysis," which provides the ability to parse the analysis processing function between analysis which may be utilized for report generation or analysis which may be utilized for alert e-mail initiation. The <frequency-to-compute> indicates the frequency with which to perform the analysis calculation selected. As with the index in the REPORTS directory, options for this field are: anytime, daily, weekly and monthly. For example, the index may be configured so that computation of a project's projected schedule of completion may be calculated anytime, and the index may be configured so that alerts are provided daily for alerts that can be generated on a daily basis and weekly for alerts that require analysis based upon weekly data. In a preferred embodiment, the default system configuration provides for the execution of the analyze files at 1:00 a.m., however, the scope of the invention should not be limited to this time for execution of the analyze files as this default can be altered as needed. As such, the Application Server 22 reviews the analyze index file(s), which directs the program to the analyze files and runs any analyze programs marked as daily that have not been run within the last twenty four hours. A similar schedule is followed for weekly and monthly reports. However, when anytime is the selected interval for the analyze files, at the time any data is collected the analyze files will be executed. Accordingly, whether a system user initiates an analysis for report generation or an analysis for alert generation, the system user has the option of selecting the time frame for the analysis cycle.

Furthermore, the mathematical algorithms developed for and contained within the system are embedded in one or more analyze files. However, for purposes of utilizing the mathematical algorithms, the time frame for initiating the algorithms is set at "anytime." Therefor, the prediction component of the system remains constantly updated as data flows into the system. Accordingly, alerts and analysis may be efficiently provided in any of the available time frames selected by the user as the prediction component is constantly updated.

Finally, each project's COLLECT directory contains one project specific data collector file per third party tool subject to data collection for the respective project. The project specific data collector files are created during the configuration of a project. It is important to note that a project may have multiple schedules in which there potentially could be multiple data collector files for the project. In such a case, the application server assembles a list of data collectors available based upon the data collector files in the COLLECT directory for the specific project and thereby retrieves the necessary information on how to obtain the necessary data through the data collector developed for collection of data from a specific third party tool.

The system's ability to access a myriad of data sources through the use of various data collectors specifically designed to access a data source, and the ability and methods of acquiring and analyzing data are some of the novel areas within the system embodied in the present invention. More specifically, the system comprises data collectors containing data collector programs for collecting the data from the data sources available on the user's system by various means and writes the output to a temporary file. For example, the system may access the following data sources if available: project schedules maintained in Microsoft Project; defect reports stored in PVCS Tracker; requirements stored in Microsoft Word; and testing information stored in Acqua/SQM. However, the system is in no way limited to the aforementioned software tools. The system is designed to accommodate and utilize alternative sources for gathering information on the state of the project and progress of design development and testing.

After the collection of data is completed by the data collector, the file is sent to the Application Server 22 and parsed to extract the data collected by the data collector. The data file generated by the data collector is a simple text file utilizing keywords to specify what data is being transferred to the application server. The keywords are illustrated in the following table:

| Keyword | Description |
| --- | --- |
| tablename=NAME | Start data for table NAME |
| /table | End data for current table |
| column name=NAME | Declares a column NAME |
| row | Start a new data row |
| /row | End current row |
| options mtime=<string> | Sets some options, i.e. last modification time. |
| options mode=replace | Tells application serve to delete the records in the existing tables, i.e. a full overwrite. History is still maintained. |
| options mode=update | Tells application server to consider the tables as incremental updates. |

For each data table that is written to the database file, the file contains the table command followed by a set of column commands. Each column command declares the set of columns that will appear in the given file. Each row provides values for exactly as many columns as were declared. The values for the rows are then provided, each one starting with a line containing the row commands with one field per line, followed by the end row command. The row and end row block may be repeated as many times as there are rows. The table ends with the end table command. Fields having embedded newlines may be specified by using a backslash at the end of the line to end the command.

The "options mode=replace" command instructs the system to delete the existing table contents. This replace command is used when parsing requirement documents are utilized. With requirement documents the only way to know that a requirement has been deleted is when it is no longer in the set being transferred. By utilizing the "options mode=replace" command, the system ensures that new requirements completely replace old ones in the given table. However, prior to initiation of the "option mode=replace" command past records must be written to the application server's database to insure retention of the date in the system for analysis, report and alert generating purposes. Accordingly, the use of the "option mode=replace" command is intended to facilitate date collection through data collectors designed to extract data from third party tools that do not maintain a notion of a transaction record.

The "options mode=update" command is utilized to point to a location in the database intended to indicate the division between data already processed and update data which has not yet been processed. The "option mode=update" command is used by data collectors where there exists transaction records that serves as a marker so that the transfer of the entire set of records need not be repeated. Accordingly, in this mode rows will not be deleted as in the "option mode=replace" command as deletion is not required since the system has a means for determining which data requires processing.

Status fields in tables can refer to values by using a lookup table command. The lookup command will allow the data collector to store lookup keys instead of the actual values, thereby normalizing the database and preventing the data collector from hard coding the lookup keys. For example lookup keys may take the following form:

lookup <colname><tablename><reference_col_name><reference_col_value>

If the table does not contain a row where the <reference_col_name> field has the specified value, then such a row is added.-In the new row the <colname> field has the value of max(<colname>)+1. Additionally, null fields may be specified by the NULL or NA keyword. The text file provides merely a mapping to the actual tables in the database as opposed to actual values. Accordingly, it is the responsibility of the users who wish to write their own data collectors to ensure that the named tables contain the columns and that they are of the right type.

The data collectors may further be programmed with the following flags:

| Flag | Description |
| --- | --- |
| /out:FILENAME | Specifies file where output is to be sent |
| /mtime:STRING | Specifies a string encoding the last time when the data was collected. |
| File(s) | Options understood by the data collector, specified in the data collector file. |

The mtime option is a string encoding the last time when the data was collected and used by the data collector to recognize that the data has not changed and does not need to be collected again. In addition, the following environment variables can be set for the data collector:

| Variable | Description |
| --- | --- |
| ACQ_PRJ_ID | Integer, project id |
| ACQ_SET_ID | Integer, set by the dcol_var setting for requirements |
| ACQ_SCH_ID | Integer, set by the dcol_var setting for Microsoft Project schedules |

Accordingly, the mtime option will be set and read by the data collector and stored in the database by the Application Server 22. Using this method to transfer the data from the data collector to the application server allows data collectors to be written independently of the application server and specific schemas. Data collectors are therefore easier to write, maintain, and can be updated independently of the entire application server for increased reliability and customizability.

To further illustrate the functions of the data collectors, the following description will be provided in relation to Microsoft Project. However, as mentioned above, the scope of the disclosure should not be limited to the third party project management tools discussed herein. Alternative project management software tools may be utilized, thereby providing comparable functions. In the example provided, information gathered by the data collectors is extracted from a Microsoft Project .mpp file through OLE (object linking and embedding) automation. All extracted data is stored in a relational database using ODBC (open database connectivity) thereby allowing the user to use any supported underlying database.

Figure 4:
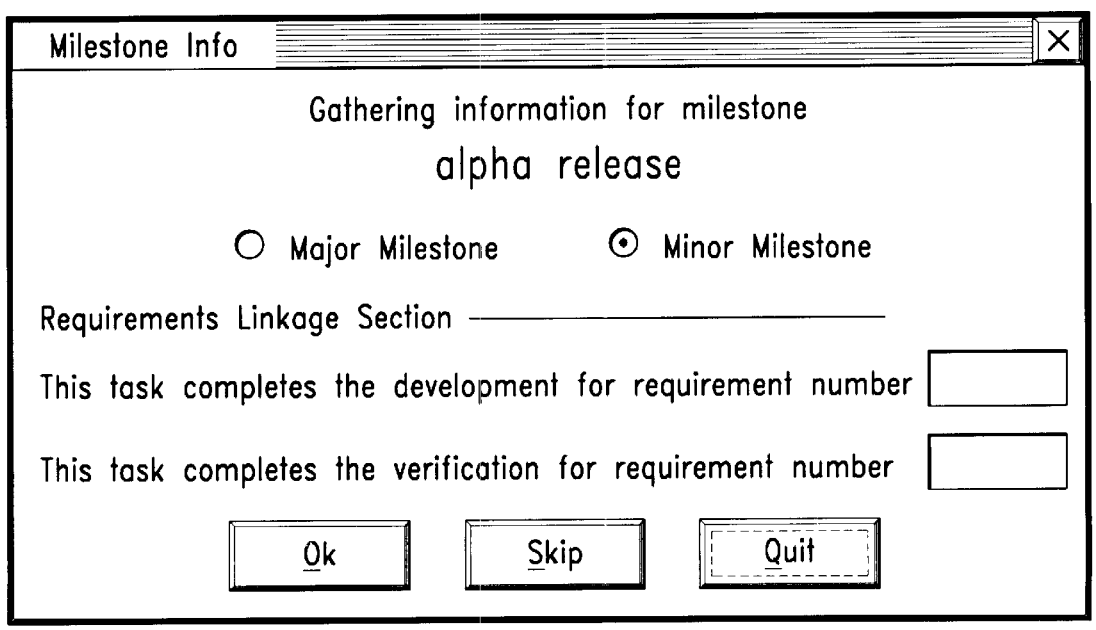
FIG. 4 is a sample dialogue box for gathering Milestone Information.
Figure 3:
FIG. 3 is a sample dialogue box for gathering Task Information.

For Microsoft Project, in particular, it is helpful to have additional information about the project schedules. For this function, a utility called the the Microsoft Project data gatherer is provided. It is written in Visual Basic and uses OLE Automation to access information from the .mpp files created by Microsoft Project. The Microsoft Project data gatherer is a utility designed to enhance information contained with Microsoft Project schedules. This data gatherer is available as a standalone application for both reading and writing a .mpp file. The Microsoft Project data gatherer proceeds through all tasks and milestones and prompts the user for information. For example, FIG. 3 is illustrative of a sample screen for accumulating task information. There are eight sections for task breakdown, including: Design/Coding, unit testing, bug fixing, test creation, test execution, contingency and other. The activity breakdown is used to calculate alerts and otherwise analyze project development. Unit Testing assists in conveying how many tests were created per unit time spent testing, Bug Fixing assists in understanding how long it takes to resolve outstanding defects, and Contingency is the information a user enters to describe padding in a task or an entire task devoted to padding which helps maintain the accuracy of the prediction algorithm. Furthermore, the Confidence levels inputted by the user are implemented by the system to assist with the prediction algorithm. When this program first reads a .mpp file, it will open a screen and ask what percentages to query from the file. In the example illustrated in FIG. 3, the user customized the percentage query at 80% and 90%. Accordingly, the information provided on this screen is used as the seeded information on the Milestone Information Screen, see FIG. 4. This information is generally entered once, and then may be kept current as the project progresses.

The data collector for Microsoft Project works like any other data collector in that it runs at it's scheduled collection time, and sends back a text file with lots of tables of data in a manner described above. OLE automation is used to automatically extract the required information from Microsoft project.

The embodied system is further configured to manage multiple files configured from multiple third party project management software through the use of multiple data collectors. Each part of a system user's organization may have separate project files requiring different data collectors to properly extract data. In such cases, the system is configured to start one data collector for each of the related project files. The schedule table stores information corresponding to known information about a particular schedule. A sample schedule table is as follows:

| Column | Type | Description |
| --- | --- | --- |
| Sch_id | Integer | Primary Key |
| sch_name | String | |
| Sch_comment | String | |
| Sch_filename | String | |
| Sch_author_id | Integer | foreign key: names(sched_author) |
| Sch_start | Date | Filled in by data collector |
| Sch_end | Date | Filled in by data collector |
| Sch_ask_prob1 | Integer | Filled in by data collector, with user requested input |
| Sch_ask_prob2 | Integer | Filled in by data collector, with user requested input |

The schedule identification (sch_id) is then generated by the database.

A schedule baselines history table stores baseline information about a given schedule. This data is not stored in the schedule's table. For example, the baselines history table is completed by the data collector if the baseline information is present in the Microsoft Project schedule. In the event a user is utilizing Microsoft Project software and the information regarding the baseline is present in the schedule, the information for the baseline is completed by the data collector file. The schedule baseline history tables are updated when a baseline changes, i.e. when new rows are added to this table reflecting new baseline dates. This allows a user to track changes to the baseline dates over time and, if necessary, to calculate a deviation from the original date. In addition, the system comprises a schedule baseline table which is similar in appearance and configuration to the schedule baseline history table, except that the schedule baseline table omits the date. This specific schedule baseline table allows for comparison of current start and end dates with the current baseline start and end dates for the project. Accordingly, in addition to tasks, the overall prediction date for each schedule is also stored in a schedule predictions table.

The data collector further obtains information from the project identified in the layout of the directory of the system. An example of a project table is as follows:

| Column | Type | Description |
| --- | --- | --- |
| prj_id | Integer | Primary Key |
| prj_name | String | Primary Key |
| prj_comment | String | |
| prj_warning_days | Integer | Number of days later, causes a yellow light |
| prj_emergency_days | Integer | Number of days before a red light |
| prj_probability_1 | Integer | First probability for prediction |
| prj_probability_2 | Integer | Second probability for prediction |

| Column | Type | Description |
| --- | --- | --- |
| prj_manager_id | Integer | foreign key: names(prj_manager) |
| prj_status_id | Integer | pending/active/retired |

The term "prj" in the above displayed table refers to the project. Furthermore, the system comprises a projects schedules table for storing information necessary for referencing a system project to all schedules used in that project. The data in the project schedules table is separated in order to allow different projects to share schedules. An example of when sharing of schedules becomes necessary is when different projects within a company are dependent on each other. Accordingly, the projects schedules table allows the system to collect information for that project only once, and is illustrated in the following table:

| Column | Type | Description |
| --- | --- | --- |
| prj_id | Integer | foreign key:projects (prj_id) |
| sch_id | Integer | foreign key:schedules (sch_id) |

The prj_id field stores the project identification. This value is different for every project in the system.

The system further comprises a table labeled "collectors table". The collectors table is used for storing data collector information so that all mtime's are stored in the same table for easy look-up. A sample of the collector table is as follows:

| Column | Type | Decription |
| --- | --- | --- |
| prj_id | Integer | foreign key: projects(prj_id) |
| dcol_tool | String | tool name |
| dcol_name | String | unique name for this data collector, supplied by the user |
| dcol_host | String | hostname to run on |
| dcol_source | String | source from which to collect data |
| dcol_mtime | String | last modification time |

The most significant fields in the collectors table is the name and the mtime. The application server 22 queries this table to determine if it needs to run the tool again. In a further embodiment, there is a project predictions table, which summarizes the high level predictions every time they are calculated.

In addition to the above discussed projects tables, the system further comprises task tables. The task tables store information about each task. A sample of the tasks table is as follows:

| Column | Type | Description |
| --- | --- | --- |
| sch_id | Integer | foreign key: schedules (sch_id) |
| task_id | Integer | Comes from the Task.Uniquid. Unique per prj_id and sch_id. |
| Task_row | Integer | Row is Microsoft Project schedule (task.id) |
| task_level | Integer | Level in the hierarchy |
| task_wbs | String | In the form of 1.2.3.4 and shows the location of the task in the outline |
| task_name | String | |

| Column | Type | Description |
| --- | --- | --- |
| task_start | Date | When should it start? |
| task_end | Date | When should it end? |
| task_duration | Long | Minutes |
| task_status_id | Integer | foreign key:-task_status (status_id) |
| task_act_start | Date | Actual start date |
| task_act_end | Date | Actual end date |
| task_act_duration | Long | Minutes |
| task_progress | Integer | From 0 to 100 |
| task_milestone_type_id | Integer | foreign key: task_type (type_id). Identified whether a milestone |
| task_is_summary | Boolean | Same as summary property (identifies a summary task) |
| task_is_critical | Boolean | Critical path task |
| User Defined | | User defined columns set during configuration of project |

The prj_id field matches tasks with projects, and the prj_id fields and the task_id fields act as a unique index. The task_id field is a unique identifier for each task within a given schedule. A task_confidence field and value is set by the user to specify the confidence level that the user has for the task being completed on time. Within the task table is a task_progress field which stores a percentage indicating how much of the task has been completed so far. For example, the percentage completion data will be provided by Microsoft Project as the illustrated third party project management software. The task table further comprises a task_uniqueId field which is an identifier for the project, so that if the user changes a task the table will not be affected.

Another table in the system is a task_type table which stores information that identifies whether a task is a milestone, and if affirmative, what level milestone has been achieved. A sample of a task_type table is as follows:

| task_type_id (Integer) | task_type (string) |
| --- | --- |
| 1 | Not_A_Milestone |
| 2 | Minor_Milestone |
| 3 | Major_Milestone |

There is also a task_baselines_history table for storing the baseline information for all tasks performed, i.e. the history of baseline dates per task. It is stored separately because it can be populated from Microsoft Project in our illustration or the system itself. This table is updated for every task when a baseline changes. For example, when a baseline changes, new rows are added to the table reflecting a new baseline date. This permits a user to monitor changes to the baseline over time and to calculate a slip from the original date, if so desired. A sample of the task_baselines_history table is as follows:

| Column | Type | Description |
| --- | --- | --- |
| sch_id | integer | foreign key:schedules(sch_id) |
| task_id | integer | foreign key:tasks(task_id) |
| task_bl_start | date | baseline start date |
| task_bl_end | date | baseline end date |
| task_date | date | date when this baseline was created |
| task_bl_duration | long | minutes |

For fast access to the status of the task and most recent developments, the system comprises a task_baselines table. In addition, for summary tasks and milestones, the system comprises a task_predictions table for storing both 80% and 90% confidence dates as computed by Acqua. A sample of the task_predictions table is as follows:

| Column | Type | Description |
| --- | --- | --- |
| sch_id | integer | foreign key:schedules(sch_id) |
| task_id | integer | foreign key:tasks(task_id) |
| taskpr_start_1 | date | |
| taskpr_end_1 | date | |
| taskpr_duration_1 | long | |
| taskpr_start_2 | date | |
| taskpr_end_2 | date | |
| taskpr_duration_2 | long | |

In the above referenced table, both sch_id and task_id fields uniquely identify a task from the tasks table. The taskpr_*_1 field corresponds to predictions given the user's first percentage confidence estimate, and the taskpr_*_2 field stores the second percentage confidence estimate where * represents either "start", "end" or "duration." Accordingly, the tasks table stores information about each individual task.

In addition, the system further comprises task dependencies tables defined as task_deps. These tables store information about the relationships between tasks. For example, if task 2 is required to be completed before task 7 can begin, such information would be stored in this table. This information is required to determine what tasks need to be completed before a milestone can be achieved. In the system, there are various types of dependencies that can be established between different tasks. An example of the task_dep table and how the dependencies are stored is illustrated in the following example:

| Column | Type | Description |
| --- | --- | --- |
| prj_id | integer | foreign key:projects(prj_id) |
| sch_id | integer | foreign key:schedules(sch_id) |
| task_id | integer | foreign key:tasks(task_id) |
| pred_sch_id | integer | foreign key:schedules(sch_id) |
| pred_task_id | integer | foreign key:tasks(task_id) |
| dep_type | string | foreign key:dep_types(dep_id) |

It is important to note, since a task may have more than one dependency the table may contain multiple rows for the same project_id, schedule_id and task_id fields.

Additionally, there are several other tables utilized in the multiple scheduling. For example, there is a resource table for storing a list of all resources available in each project. A person can be listed as a resource on two different projects but appearing with a different resource identifier each time. An assignments table stores a list of all assignments for each task in the project. The assignments are stored in a separate table to allow a particular task to be assigned to more than one resource. Finally, the system comprises a task status table which is a lookup table for the status of different tasks.

Through the use of the tables schedule changes are tracked over time to assist with predicting schedule dates and various trends in product development. Accordingly, the following information is versioned: resource schedule history, task history and completion dates. For each resource, a resource history table stores the frequency a resource does not meet a schedule. In addition, the resource history table calculates percentage of completion for the resource. A task history table stores information regarding the frequency in which task dates are changed and by how much. The date changes commonly reflect a time slip or functionality change, and this information enables the user to identify how the project deadlines changed over time. This table detects individual task and summary task changes. If the user would desire to ascertain historical information baseline date changes for tasks and historical information on phase changes, the user would have to access the task baseline history table and the phase table/task history table respectively. Finally, the completion table is completed by the analysis program that executes the Monte Carlo simulation. This table contains all of the data resulting from the Monte Carlo simulation. Accordingly, each time the program is executed, the old information for this project is deleted.

Furthermore, the software quality management capability of the Application Server 22 functions as a critical component of the application delivery management system. The software quality management capability ensures that all of the manual and automated testing activities are coordinated and archived. The software quality management (SQM) data collector allows collecting of all information pertaining to the testing effort and provides statistics of how many tests were added, removed, how many are passing, and how many are failing. This information is then used in the schedule prediction and trend graphs. The SQM data collector generates a suite identifier field for its internal database storage. Furthermore, the SQM data collector comprises a project suites table for storing information between suites and projects, a suite table for storing information about each suite, and a tests table for storing information about all test cases in the current suite. The test table stores classes and cases. A test class result is pass if all of its results pass, otherwise its result is fail. At such time as a test is deleted from a suite, it is removed from the tests table. The SQM data collector further comprises a lookup table for the state of test codes, a lookup table for the result codes, and a requirements table for storing the associations between requirements and tests, thereby allowing the determination of which requirements do not have tests, how many pass and how many fail. A suite can have one set of requirements associated with it. Accordingly, a single test suite can only verify one set of requirements as defined by a set of requirements documents.

Furthermore, the SQM data collectors comprises the following tables: a defects tables for storing the association between defects and tests; a jobs tables for storing information about the test jobs; an outcomes table for storing information about the outcomes of tests in those jobs; and a trends table for storing computed trend information about tests. Based upon all of the data collected from the SQM data collectors and the above-defined generated tables, software quality management reports are generated. The following reports are available based upon these data collectors: percentage of requirements which have been verified, failed or untested; current test results for a given project of pass, fail or unexecutable; an outcome history for a given test case; a trend of new tests added versus the number of verified requirements; and a trend of time spent testing versus the number of verified requirements. Accordingly, the SQM data collectors, ensure that all of the manual and automated testing activities are coordinated.

After data is collected from the identified tools in the system and prior to having reports generated, analyzer applications are invoked to analyze the data collected and write their reports back to the database. As discussed earlier, alerts are one form of analyzers. They are mechanisms for notifying team members when there are potential problems with the project. Team members are notified in two ways: through monitoring reports accessible through a web browser and by e-mail alerts.

Alerts are stored in the database of the server machine 20. An alerts_defn table stores the alerts definitions, as follows:

| Column | Type | Description |
| --- | --- | --- |
| prj_id | integer | foreign key:projects(prj_id) |
| alert_id | integer | unique per project |
| alert_name | string | name of alert |
| sample_msg- | string | sample message to help configuration screen |
| alert_date | date | date when this alert was last calculated (i.e. the application server ran the last analyze program) |
| email_users | string | space separated list of users to email |
| category | string | user-defined name of the category in which this alert is placed |
| filter | string | future string that we can selectively filter alerts on. |
| Alert_active | integer | true means this alert is active |

In addition, the database further comprises an alert_threshold table which holds threshold and filter values for specific alerts. It is important to note that there may be more than one threshold per alert. The alert_threshold table is configured as follows:

| Column | Type | Description |
| --- | --- | --- |
| prj_id | integer | foreign key:projects(prj_id) |
| alert_id | integer | foreign key:alert_defn(alert_id) |
| threshold_name | string | name to use to look up the value in the pair (proj_id, alert_id, threshold_id) |
| threshold_type_id | long | foreign key: threshold_types (threshold_type_id) |
| threshold_prompt | string | message to use to prompt for a new threshold value |
| threshold_value | string | value, stored as a string for this threshold for this alert |

Furthermore, the threshold_type table is a look-up table for the threshold_type_id field and is configured as follows:

| Column | Type | Description |
| --- | --- | --- |
| threshold_type_id | long | primary key |
| threshold_type | string | |

Alerts that want to find the threshold variables in order to compute whether to generate the alert must open the alerts definition table in the database and find the alert identification alert_id field that matches their alert name. Then they can scan the alert_threshold field table looking for a match of alert_id field and threshold_name field, at which point they will extract the threshold_value field.

Each of the alerts comprise threshold levels for which new values of the threshold can be modified, wherein any new modification value will take effect the next time the alerts are computed. The following alerts, for which there is no hierarchy, are currently available on the system, although this listing of alerts should not be considered limiting in that additional alerts can be added by users on an as needed basis. These alerts represent common software practices, or common warning signs of software development projects getting into trouble.

Applied as a whole, these alerts represent a knowledge base of software development rules that serve to warn project managers of potential pitfalls before, during or after they have occurred. The benefit is obvious for early warnings of potential pitfalls, as project managers can take early corrective action. Timely presentation of accurate information during critical stages is also helpful for project managers. The title of the alert is generally descriptive of the message it is conveying to the user:

| | |
| --- | --- |
| Defects Rising Too Fast | Tasks Late |
| Not Enough New Defects | Summary Task Late |
| Not Enough New Tests Created | Summary Task Slip Predicted |
| Test Creation Warning | Milestone Late |
| Not Enough Test Were Executed | Milestone Slip Predicted |
| Test Passing Rate | No Baseline Schedule |
| Critical Path Warning | Requirements are not linked to development task and/or milestones |
| Missing Milestone | |
| Project Data Out of Date | |
| Project Warning | Task Slip Predicted |
| Schedule Warning | Schedule Slip Predicted |
| Project Confidence Decreasing | Project Slip Predicted |
| Schedule Confidence Decreasing | Project is Late |
| Project Prediction Date Slipping | Schedule is Late |
| Schedule Prediction Date Slipping | Requirements not Linked to Testing Tasks |
| Schedule Changed | |
| Project Changed | |
| Low Testing Effort | |

The alerts are computed at such time as the analyze file is executed. The analyze file will create rows in an alert table. After creation of the rows in the alert table, an alert page reads the rows to generate the proper set of alerts to display to the user. Programs which calculate alerts are specified in the analyze directory, and can also generate pages or additional tables in the database, similar to other analyze directory programs. Furthermore, each alert program in the analyze directory can generate more than one alert, but they are all of the same type. For example, if one alert looks for late schedules, this alert can generate two alert messages as long as the alerts comprise the same identification.

The alerts are statically generated and presented to the user in a single html page. Furthermore, each alert begins with an explanation of the alerts, and may link to pages with more information such as a link to customize, a link to receive help on this specific alert, and a link to delete the alert. The link for more information takes the user to the page that the alert generation program found was the primary trigger for the alert. The help link takes the user to the on-line help which explains more information about the alert generated, what the alert message is trying to convey to the user, what the user can do about the alert generated, and the definitions of the threshold values. The customize link takes the user to a page enabling them to customize the threshold values. The delete link deletes the alert.

An alerts_generated table stores all alerts generated in the database of the server machine_. A sample of an alert generated table is as follows:

| Column | Type | Description |
| --- | --- | --- |
| prj_id | integer | foreign key:projects (prj_id) |
| alert_id | integer | foreign key:alert_defn(alert_id) |
| message | string | this string may be long, contain html tags, tables . . . |
| priority | integer | |
| alert_date | date | |
| mail_sent | boolean | |

The alert programs add rows to the alert_generated table. The same alert name is presented as that utilized in the analyze directory. The message and priority field are set by the alert program, and date, mail sent and alert_id fields are automatically set. In addition, the user is not limited to alerts present in the system. A user can add new alerts by writing the alert program and creating new analyze files in the specific project's ANALYZE directory, adding an entry for them in the ANALYZE directory's index file.

The results produced by the analyzers may then be utilized by the reports generators. The user may specify when reports should be generated. The user further has the option to force the regeneration of a given report, which may be useful after documents in the database are updated and the user wants to see the new confidence level predictions for meeting project delivery deadlines. Reports are generated by processing html files stored in a directory accessible to the Application Server 22, and may include calls to programs to generate some additional html or images. Furthermore, these html files may include applets, frames, or any other type of standard web-based logic.

There are several customization options available for the reports generated. For example, the users can modify the web site for their project by editing these html files directly. Furthermore, users can add new links by editing the html pages directly, or the users can add new pages by adding lines to the index file in the PROJECT/REPORTS directory. Finally, user can embed commands to generate graphs in existing or new html pages. Accordingly, the user has a plurality of options available for customizing the reports generated by the application.

The user further has the option to force data to be collected interactively. In such circumstances, the user is prompted to designate which data sources to update and which reports to generate. Regardless of how or when the data is collected and the reports are generated, all of the reports are catalogued and archived by default once per day immediately before the daily data collection report generation occurs. Reports that are regenerated are placed into a LATEST directory updating the previous information stored in this directory. However, the previous set of reports can always be retrieved from the LATEST directory. Accordingly, the Application Server 22 first collects all of the data, then runs all of the analyzers, and finally generates all of the reports for a given project, wherein all of the reports are archived and accessible from other reports.

In a further embodiment of the invention, the invention has the ability to predict when projects will be completed. The system gathers information from a wide variety of tools to deliver a realistic assessment of project delivery, and a more realistic assessment than one tool can provide individually. During the initial setup, as disclosed earlier, the user is requested to supply information that assists the system in producing accurate predictions. In a preferred embodiment, the system uses the following data sources to provide prediction of project delivery, although additional data sources may be utilized with access to a related data collector: Project schedules maintained in Microsoft Project; Defect reports stored in PVCS Tracker; Requirements stored in Microsoft Word; and Testing information stored in the Acqua test management system. Based upon the initial information provided by the user and the information obtained by the data collectors, the prediction process incorporates a Monte Carlo algorithm to predict accuracy of project completion.

The prediction algorithm is described as follows: First, the algorithm builds a probability curve for each task. The curve is set upon at least three data points the user has entered for each task, through the project gatherer utility, although fewer data points may be utilized. According to the probabilities calculated, a duration for this task is assessed. Second, the system analyzes the individual resources assigned to the task based upon the history of the resource in completing their tasks in a timely manner. Based upon the analysis, the duration is either increased or decreased based upon the history collected and the percentage of timely task completions. Accordingly, this outlined analysis is applied over approximately one hundred iterations to establish a probability curve for this one task, which will then be used as input into the overall Monte Carlo simulation. In this novel manner, multiple sources of data are applied to each individual task in order to determine it's liklihood (probability) of completing over a range of times. Applying additional sources of information other than mentioned above is easily imagined and can be applied equally well to the overall algorithm.

Following this, the following three step analysis is undertaken. First, a trend analysis is implemented. The trend analysis generates additional potential delivery delays by analyzing various trends, such as incoming defects, number of tests created, and number of regressions found. Second, an alert analysis is performed. Alerts that have been triggered might mean a delivery problem. In the event that factors causing the alert have not previously been taken into consideration in prior steps of the prediction algorithm then the duration of the prediction must be altered for early or delayed prediction of product delivery. Finally, a comparison of additional time required in the trend and alert analysis against contingency factors is attained and time for project completion is increased or decreased from the total duration, as deemed appropriate.

The basic prediction calculation works by defining a probability map for each task, as described above, and then adding the additional tasks that represent potential delays. The Monte Carlo simulation technique is then applied over a plurality of iterations so as to establish a refined probability curve for the entire schedule. The current date is then fitted to the curve and a confidence level is assigned to the task completion. In addition, the user can also access and review 80% and 90% confidence dates (or a different set of confidence factors of their choosing) for project completion.

In a preferred embodiment, the system comprises the ability to manage, monitor and predict completion of projects based upon a multi-faceted, multi-data, multi-tooled approach. As such, the prediction software may operate to evaluate completion of a plurality of tasks in order to accurately predict completion of an entire project comprising a plurality of tasks and/or deliverable units. The system evaluates information gathered from an array of software tools to deliver a realistic assessment of project completion.

The presently disclosed embodiments are therefore considered in all respects illustrative and not restrictive. The scope of the invention is indicated by the appended claims, rather than the foregoing description, and all changes which come within the meaning and range of equivalency of the claims are therefore intended to be embraced therein.

What is claimed is:

1. A method for forecasting project completion, comprising:
   (a) collecting data from a project development tool;
   (b) managing said data;
   (c) analyzing said data;
   (d) processing said data through a project completion prediction tool;
   (e) predicting a time interval for completion of said project wherein the step of processing said data includes assigning confidence level for a task; and wherein the step of assigning said confidence level for said task building a probability curve for attaining a confidence level for completion of said task.

2. The method of claim 1, wherein the step building said probability curve includes analyzing resources assigned to said task.

3. The method of claim 2, wherein the step of analyzing resources includes adjusting a duration for completion of said task.

4. The method of claim 1, wherein the step of analyzing said data includes evaluating data from prior task completions.

5. The method of claim 1, wherein the step analyzing said data includes an analysis of said data over a plurality of iterations.

6. The method of claim 1, further comprising the step of applying said probability curve to a Monte Carlo simulation.

7. The method of claim 6, further comprising implementing a trend analysis for determining a potential change in completion of said task.

8. The method of claim 7, wherein said change is selected from the group consisting of: incoming defects, quantity of tests created, quantity of regressions found, and combinations thereof.

9. The method of claim 7, further comprising the step of performing an alert analysis.

10. The method of claim 9, wherein the step of performing an alert analysis includes storing alert information in a database and comparing alert analysis results with alert identification values.

11. The method of claim 10, further comprising the step of generating an alert when said results meet said identification values.

12. The method of claim 1, wherein the step of reporting project completion analysis includes reports selected from the group consisting of: data of requirements verified, data of requirements failed, data of requirements untested, current test results, history for a test case, a trend of new tests added versus the quantity of verified requirements, and a trend of time spent testing versus the number of verified requirements, and combinations thereof.

13. A computer system for predicting project completion, comprising:
  a database to store project information;
  a manager to collect data from a project development tool;
  an analyzer to evaluate collected data; and
  a tool to build a probability curve from a user defined confidence level for completion of a task.

14. The system of claim 13, further comprising an adjustment tool to change a duration of task completion.

15. The system of claim 14, wherein said change of duration is based upon a history of timely task completion of a prior task.

16. The system of claim 13, wherein said tool applies said analyzer over a plurality of iterations to build said probability curve.

17. The system of claim 13, further comprising a statistical tool to apply said curve to a Monte Carlo simulation.

18. The system of claim 17, wherein said statistical tool conducts a trend analysis to determine a change in completion of said task.

19. The system of claim 18, wherein said change is selected from the group consisting of: incoming defects, quantity of tests created, quantity of regressions found, and combinations thereof.

20. The system of claim 18, further comprising an alert analyzer.

21. The system of claim 20, wherein said alert analyzer compares an alert analysis result to an alert identification value.

22. The system of claim 21, further comprising an alert generator to activate an alert when said analysis result meets said identification value.

23. An article comprising:
  a computer-readable signal-bearing medium;
  means in the medium for collecting data from a project development tool;
  means in the medium for analyzing said data; and
  means in the medium for building a probability curve illustrating confidence of an operator for completion of a task.

24. The article of claim 23, wherein the medium is selected from the group consisting of: a recordable data storage medium and a modulated carrier signal.

25. The article of claim 23, wherein said data collecting means comprises a data collector to extract data from a project development tool.

26. The article of claim 23, further comprising a tool for changing a duration for completion of a task.

27. The article of claim 23, wherein said curve building means applies said data analyzing means over a plurality of iterations.

28. The article of claim 23, wherein said curve building means applies said data to a Monte Carlo simulation.

29. The article of claim 23, further comprising an alert analysis tool to activate an alert when an alert analysis result meets an alert identification value.

* * * * *